April 13, 1937.  J. A. FLICKER ET AL  2,077,144
HAND TRUCK
Filed June 8, 1935
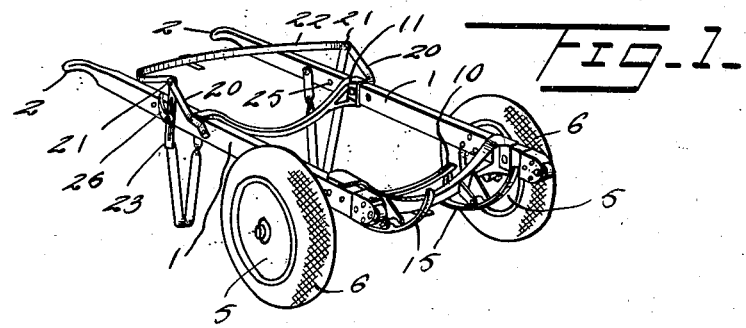
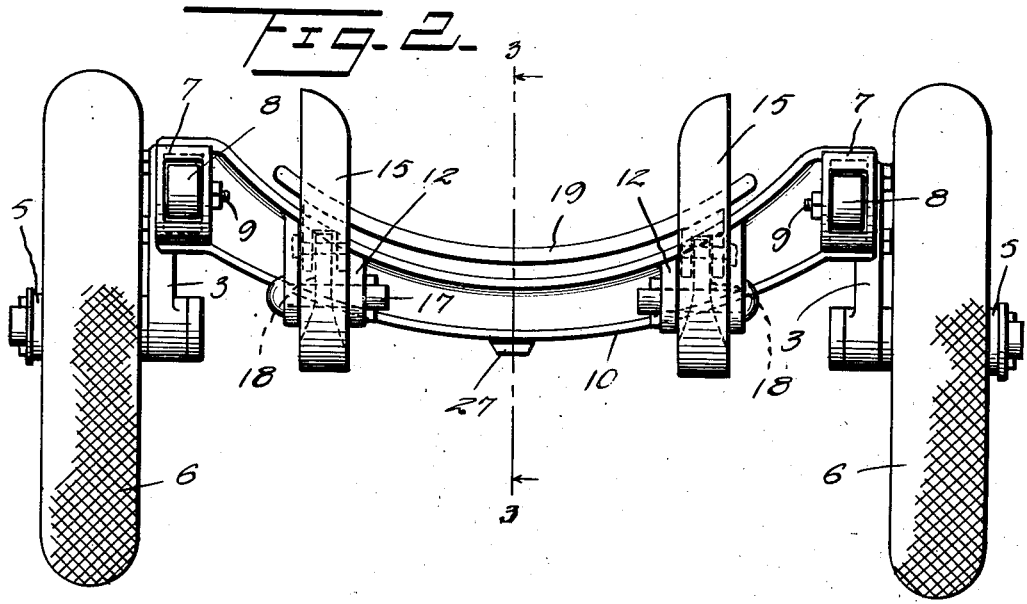
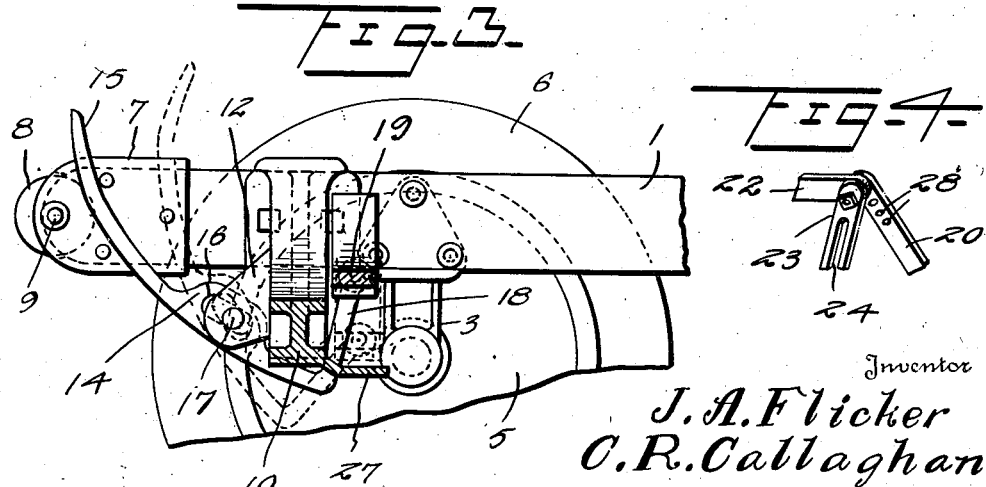
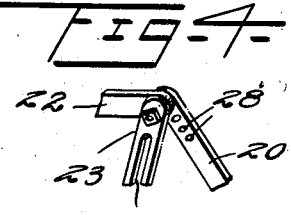
Inventor
J. A. Flicker
O. R. Callaghan
By Watson E. Coleman
Attorney Patented Apr. 13, 1937

2,077,144

UNITED STATES PATENT OFFICE 2,077,144

HAND TRUCK

John A. Flicker and Cornelius R. Callaghan, Bellevue, Ohio

Application June 8, 1935, Serial No. 25,650

2 Claims. (Cl. 214—65.4)

This invention relates to a hand truck and is an improvement on the type of truck as comprised in Patent #1,313,883 granted August 26, 1919.

It is an object of the present invention to provide a hand truck with means made effective by the load placed upon the truck to facilitate picking up of the load and also maintenance of the load in position upon the truck.

Another object of the invention is to provide a truck of this kind which can be employed to advantage to pick up and convey cylindrical containers such as barrels, drums, etc.

The invention consists in the details of construction and in the combination and arrangement of the several parts of our improved hand truck whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein:—

Figure 1 is a view in perspective illustrating a hand truck constructed in accordance with an embodiment of our invention;

Figure 2 is an enlarged view in front elevation of the truck as herein disclosed, certain of the parts being omitted for clarity;

Figure 3 is a fragmentary sectional view taken substantially on the line 3—3 of Figure 2;

Figure 4 is a fragmentary view in perspective of the means herein comprised for mounting an end portion of the bail as herein embodied.

As disclosed in the accompanying drawing, 1 denotes the side bars included in the frame of a truck and which are provided at their rear with the handles 2. Depending from the forward end portions of the bars 1 closely adjacent to but spaced from the forward ends thereof are the bearing arms or brackets 3 each providing a mounting for a wheel 5. While the wheel 5 may be of any type desired we find it of advantage that the same be of a disk type and be provided with a pneumatic tire 6.

As is clearly illustrated in Figure 3, the forward end portion of each of the side bars 1 extends forwardly beyond the adjacent applied wheel 5 and said extended portion has applied thereover a bearing cap 7 carrying a roller 8, the axis 9 of said roller 8 being substantially at the transverse center of the side bar 1. This roller 8 as illustrated in Figure 3 extends slightly beyond or forwardly of the bearing cap 7 for direct contact with the floor or other surface as the side bars 1 are lifted into substantially a vertical position to initially engage the load to be placed upon the truck.

The rollers 8 will materially facilitate the required initial manipulations of the truck as of course with the bars 1 in substantially vertical position the wheels 5 or more particularly the tires 6 thereof will be elevated above such floor or other surface. Slightly in advance of the bearing arms or brackets 3 the side bars 1 are connected by a rigid saddle 10 disposed on a desired downward curvature particularly as pertains to its upper edge face and at a point a material distance inwardly from the arms or brackets 3 the side bars 1 are again connected by a second saddle 11 similar to the saddle 10. These saddles 10 and 11 support the load placed upon the truck and the curvature of the upper edge faces is such as to permit the truck to be effectively used in connection with cylindrical containers, such as drums, barrels, etc. The curved beds afforded by these saddles 10 and 11 also allows the truck to be employed with equal facility with barrels or drums of either a straight or bulged type.

The forward saddle 10 in relatively close proximity to its ends is provided with the forwardly directed pairs of lugs 12 and received between the lugs 12 of each pair is an upstanding plate flange 14 carried by the intermediate portion of an elongated arcuate hand or member 15. The plate 14 of each of the hands or members 15 is positioned rearwardly of the longitudinal center of said hand or member 15 and is provided with a slot 16 extending in a general direction lengthwise of the hand or member. Directed through this slot 16 is a holding pin 17 which is also directed through the lugs 12 and bridges the space therebetween. By this means the hand or member 15 is supported for swinging movement in a direction toward or from the adjacent side bar 1.

The rear or inner end portion of the hand or member 15 is continued by an upstanding arm 18 and the arm 18 of one hand or member 15 is connected with a similar arm of the second hand or member 15 by the arcuate saddle member 19 which normally, or when the truck is free of load, is positioned rearwardly of the forward saddle 10 and at a distance slightly thereabove. This normal position of the saddle 19 is maintained by gravity as the weight of the hands or members 15 in advance of their mountings 17 is sufficient to overcome the weight carried by said hands or members 15 rearwardly of their mountings 17.

The uppermost position of the saddle 19 is determined by contact from above of the rear portions of the hands or members 15 with the saddle 10.

Pivotally connected to the side bars 1 at points preferably closely adjacent to but slightly in advance of the rear saddle 11 are the lower end portions of the upstanding rock arms 20, the upper end portions of which being pivotally connected, as at 21, with a swinging holding element or bail 22. Also pivotally connected, as at 21, with the outer or upper end portions of the arms 20 are the extremities of the straight arms 23 which extend down and across the outer faces of the side bars 1. Each of these arms 23 is slotted, as at 24, and directed through the slot is a conventional bolt 25 also disposed from within through the adjacent side bar 1 and coacting with the outer end portions of the bolt 25 is a conventional speed nut 26.

The slotted arm 23 permits a selected swinging adjustment of the associated arm 20 as may be preferred or required in connection with the character of the load to be placed upon the truck.

The front saddle 10 at its central part has projecting rearwardly from its lower marginal portion a lug 27 which provides a stop with which the saddle 19 contacts from above to limit the upward rearward swinging movement of the outer or forward end portions of the hands or members 15. The barrel, drum or kindred container to be transported by the truck is initially upended and the truck is advanced in proximity to the container and then swung upward to a position past the vertical to cause the bail 22 to engage over the upper portion of the container, such upward swinging movement being about the rollers 8 as fulcrums and the swinging mounting of the hands or members 15 assure no hindrance or obstruction being offered by said hands or members 15 to this operation.

After the bail or holding element 22 has been engaged over the upper portion of the container, the side bars 1 are swung rearwardly and as said bars extend in advance of the wheels 5 and the tires 6 thereon this rearward movement of the side bars 1 will permit the forward end portions of the hands or members 15 to be engaged below the lower end of the container. As the truck continues to swing downwardly as the container seats upon the saddles 19 and 11, the forward portion of the container upon the truck or that portion of the container which was rested upon the floor or other support will contact from above with the saddle 19 and the weight of the container and its content will result in an automatic upward swinging movement of the forward end portions of the hands or members 15 whereby the container is effectively held in applied position upon the truck to facilitate its conveyance from one place to another. The delivery of the container from the truck may be accomplished with equal convenience and facility. It is to be noted that each of the arms 20 in its outer portion is provided with a series of longitudinally spaced openings 28. This is to provide for a selective adjustment of the pivot member 21 as may be desired as an adjustment is permitted other than that afforded by the endwise adjustment of the associated arm 23.

From the foregoing description it is thought to be obvious that a hand truck constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. A hand truck including a pair of side bars, a saddle interposed between and connected to the side bars, ground engaging members carried by the side bars, hands pivotally engaged with the saddle and extending forwardly therefrom for coaction with the work to be placed upon the truck, said hands having rearwardly disposed extensions, and a saddle connecting said extensions, said saddle of the extensions maintaining a position above the saddle of the truck when the truck is free of load, the load when received upon the truck engaging the saddle to swing upwardly the forwardly projecting hands, said hands being free to swing when the truck is free of load.

2. A hand truck including a pair of side bars, a saddle interposed between and connected to the side bars, ground engaging members carried by the side bars, hands pivotally engaged with the saddle and extending forwardly therefrom for coaction with the work to be placed upon the truck, said hands having rearwardly disposed extensions, a saddle connecting said extensions, said saddle of the extensions maintaining a position above the saddle of the truck when the truck is free of load, the load when received upon the truck engaging the saddle to swing upwardly the forwardly projecting hands, said hands being free to swing when the truck is free of load, and means carried by the saddle of the truck for contact with the saddle of the extensions to limit the swinging movement of the hands in one direction.

JOHN A. FLICKER.
CORNELIUS R. CALLAGHAN.